United States Patent Office 3,358,064

Patented Dec. 12, 1967

3,358,064
ENCAPSULATING MOLDING COMPOSITION AND METHOD FOR MOLDING THE SAME

William R. Belko, Jr., Huntington, Conn., assignor to Vitramon Incorporated, Monroe, Conn., a corporation of Delaware No Drawing. Filed Mar. 24, 1964, Ser. No. 354,437
8 Claims. (Cl. 264—236)

The present invention relates to novel molding powders, the method of making the same, the method for molding high impact strength, temperature-resistant bodies therefrom, such as casings for electrical capacitors, having an exceptionally high degree of moisture resistance.

It is well known in the electrical art to encapsulate, pot or fill electrical components, such as capacitors, with a number of resinous materials so as to completely encase the body of the component within an insulating jacket which seals and protects the body against moisture, dirt, manual contact and physical shock or vibration. While many resinous compositions perform this function with varying degrees of success, the epoxy resins are preferred because of their inherent properties of high impact strength, temperature stability and good insulating properties.

While the epoxy resins have been found to be the resins most preferred for the molding of insulating jackets around electrical components, it has been discovered that, while they have a moisture resistance which is relatively high, it is not sufficiently high to pass the rigid military specification and similar requirements in connection with electrical components designed for high reliability use. Military Specification Standard MIL–STD–202B, Method 106A, for example, requires that electrical capacitors be able to endure 240 hours with 100 D.C. volts applied at varying temperatures in a 95% relative humidity condition without failure. Under such conditions capacitors encapsulated with most known resinous compositions fail unless certain other treatments such as vacuum impregnation and undercoating are used in addition to the resin encapsulation. Such other treatments are tedious and costly and often require that the capacitor leads be aftertreated with a cleaning agent.

Therefore it is an object of the present invention to provide a novel molding powder having all of the beneficial properties of known epoxy molding powders and having the capacity to form cured molded bodies having an exceptionally high degree of moisture resistance, sufficient to pass the rigid requirements of military specifications.

It is another object of this invention to provide a novel epoxy molding powder composition having the capacity to form cured molded bodies which are substantially free of unfilled cracks, crevices, voids or interstices.

The objects and advantages of the present invention are accomplished by the discovery that the moisture resistance properties of an epoxy molding powder can be improved, to the extent that such molding powders can be used to form encapsulated electrical components such as capacitors which will pass rigid military specifications standard such as MIL–STD–202B by uniformly dispersing throughout the epoxy molding powder a small amount of a liquid, heat-curable silicone polymer which is incompatible with the epoxy powder and which requires a higher temperature and/or a longer heating period for its cure than does the epoxy resin.

While the mechanics of the present invention are not completely clear, it appears that a body molded from an epoxy resin contains a large number of fine cracks, crevices, voids or interstices dispersed throughout the body. It is through these voids that moisture apparently is able to penetrate to the encased component such as the capacitor body and thus deteriorate the insulating properties of the resin. I have discovered that the moisture resistance of a molded epoxy resin can be substantially improved, thereby preserving the excellent insulating properties of the epoxy resin, by including as a part of the initial epoxy molding powder a small amount of a liquid heat-curable silicone polymer which will remain liquid and mobile while the epoxy resin is cured to a hard solid state and which can be subsequently cured to a solid state.

It is not clear why or how the addition of liquid silicone polymer substantially improves the moisture resistance of the epoxy molding powders of the present invention. It appears that the liquid silicone polymer distributes itself throughout the voids, cracks, crevices or interstices of the epoxy body to fill and seal the same since the silicone polymer remains a mobile liquid and the molding of the epoxy resin is conducted under pressure. There is also some reason to believe that the silicone polymer distributed throughout the pores of the epoxy body expands to some extent during its own cure and solidification and thereby tightly seals and fills the pores. There is also some indication that at least a portion of the liquid silicone polymer may be exuded from the epoxy resin due to the molding pressure and/or expansion so as to form a continuous, impermeable silicone coating on the inner and outer surfaces of the molded epoxy resin body. It is most probable that the advantages of the present invention are a result of a combination of the above effects.

The epoxy resins suitable for use according to the present invention comprise any of the conventional epoxy molding resins known in the art. Such resins have good insulating properties, high impact strength, good heat resistance and are preferably of the self-extinguishing type. Such epoxy resins are formed by the reaction of a polyhydric phenol such as a p,p′-dihydroxy diphenyl alkane, also known as a bisphenol, with a polyfunctional halohydrin such as epichlorohydrin in proportions and under conditions well known to the art and as taught for instance in U.S. Patent No. 2,521,911. Such epoxy resins are complex polyether derivatives of polyhydric phenols having alternating aromatic and aliphatic nuclei bonded through an oxygen ether linkage.

Epoxy molding resins may be represented by the following structural formula:

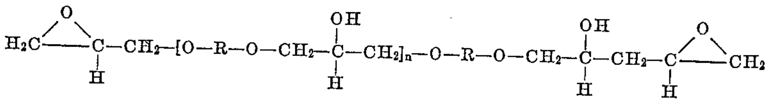

wherein R is an aromatic or diphenyl alkane radical and $n$ is an integer.

To aid in the cure of the epoxy resin it is conventional to add a polyfunctional cross-linking agent such as a diamine.

The silicone polymers suitable for use according to the present invention are the liquid silicon-oxygen polymers represented by the following structural formula:

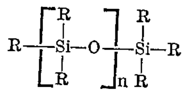

wherein R represents identical or different monovalent organic radicals selected from the group consisting of alkyl radicals having from 1 to 4 carbon atoms and phenyl, tolyl or xylyl radicals, and $n$ is an integer of from 3 to 1000.

The preparation of such silicone polymers by the hydrolyis of a readily hydrolyzable dialkyl silane, diaryl silane or alkyl aryl silane is well known in the art.

To aid in the cure of the liquid silicone polymer to the solid state, it is conventional to add a curing agent such as benzoyl peroxide or other acyl peroxide in an amount of from 2 to 10% of the silicone polymer to promote oxidation-type polymerization.

The following procedure is outlined to illustrate the use of the molding compositions of the present invention for purposes of molding a highly moisture-resistant insulating jacket about an electrical capacitor. The capacitor comprises a body including dielectric and electrically conductive elements which have joined thereto a pair of terminal leads or wires.

The capacitor is placed within a mold cavity designed to accommodate only the body of the capacitor and the heated epoxy molding powder composition is injected into the mold cavity under a pressure of 50 to 500 p.s.i. The mold is heated to a temperature sufficiently high to advance cure the epoxy resin. Generally a temperature of 300° F. to 400° F. for a period of time of from 1 to 5 minutes is sufficient for this purpose.

Next, pressure is released and the capacitor is removed from the mold. The body of the capacitor is now encased or encapsulated in a hard epoxy jacket. Then the capacitor is placed in an oven having a temperature of 200° F. to 400° F. and heated for at least an hour to effect the solidification and cure of the silicone polymer. While the time and temperature required to effect cure of the silicone polymer may be varied depending upon the identity of the specific silicone polymer being used, it is generally preferred to cure the silicone polymer at a temperature in the vicinity of 300° F. for a period of at least about 4 hours.

The liquid silicone polymer additive of the present invention has been found effective in amounts as low as about 0.25% by weight based upon the weight of the epoxy powder. The preferred amount is from 0.75% to about 2%. While amounts in excess of 2% are effective, they do result in a tackiness or stickiness which causes the molded body to stick to the mold and resist removal therefrom. However, through the use of mold release agents and the like, it appears that the present silicone polymer additive may be used in amounts as high as about 5% by weight.

To demonstrate the new and unexpected advantages of the present invention, the above procedure was identically repeated for the production of 26 capacitors, 13 of which were encapsulated with Fiberite E9400 epoxy resin and 13 of which were encapsulated with Fiberite E9400 epoxy resin modified according to the present invention by the addition of Silicone Resin 1107, 0.75% by weight, based upon the weight of the Fiberite.

Fiberite E9400 is a high-impact-strength, self-extinguishing epoxy molding powder commercially available from the Fiberite Corporation, Winona, Minnesota, and believed to comprise the reaction product of epichlorohydrin and p,p'-dihydroxy diphenyl-2,2-propane.

The Fiberite powder is modified according to the present invention by adding 0.75% by weight, based upon the weight of the Fiberite powder, of Silicone Resin 1107 which is commercially available from Dow Corning Company. The Fiberite powder and liquid silicone polymer are blended together for several hours to bring about uniform dispersion of the small amount of silicone polymer throughout the epoxy powder.

Silicone Resin 1107 is a liquid silicone polymer, incompatible with the Fiberite E9400, and believed to have the formula:

$$R-\left[\begin{matrix} R \\ | \\ Si \\ | \\ R \end{matrix}-O-\right]_n\begin{matrix} R \\ | \\ Si \\ | \\ R \end{matrix}-R$$

wherein R represents monovalent organic radicals selected from the group consisting of methyl and phenyl groups, at least 50% of the groups being methyl and at least some of the groups being phenyl; and $n$ is an integer.

The capacitors were encapsulated in a mold having a cavity adapted to accommodate the dielectric body of the capacitor. The mold was closed and heated to a temperature of 325° F. The heated Fiberite E9400 molding powder was then injected into the mold under a pressure of 300 p.s.i. to fill the die cavity and surround the dielectric body of the capacitor. After a period of two minutes to permit advanced cure of the Fiberite the mold was opened and the encapsulated capacitors were removed to an oven heated to a temperature of 300° F. where they were baked for a period of 16 hours.

This identical procedure was repeated with 13 new capacitors but using the Fiberite E9400-Silicone Resin 1107 molding powder mixture in place of the Fiberite powder alone.

The capacitors encapsulated with the different molding powders were then tested to compare their moisture resistance properties by subjecting them to polarized moisture resistance testing at a potential of 100 volts D.C. for 240 hours as specified in MIL-STD-202B, Method 106. Most of the capacitors encapsulated with the epoxy powder alone catastrophically failed after a period of a few days and none of these 13 capacitors had sufficient moisture resistance to endure 10 days or 240 hours under these conditions without failing catastrophically, as required by the military specification. On the other hand, all of the 13 capacitors encapsulated with the epoxy-silicone mixture withstood this moisture resistance test for 10 days or 240 hours without a catastrophic failure.

While the present invention is directed mainly towards improving the moisture resistance of epoxy molding compositions for use in the encapsulation of electrical components, it should be understood that the invention is also applicable to other molding resins such as phenol-aldehyde, melamine-aldehyde and urea-aldehyde resins and the like. The density and moisture resistance of such resins can be increased by incorporation of liquid silicone polymers according to the present invention. The only requirements are that the molding resin and the silicone polymer must be incompatible and that the molding resin be heat-curable at a lower temperature or at a shorter period of time than the silicone polymer.

While the present invention has been exemplified for the encapsulation of capacitors, it should be understood that the present molding powders may be used for the molding of any body where exceptional moisture resistance is required, such utility not being limited to the electrical component field.

Variations and modifications may be made within the scope of the claims and portions of the improvements may be used without others.

I claim:

1. A novel heat-curable resinous powder composition for the forming of bodies having high moisture resistance comprising a heat-curable resinous powder having uniformly mixed therewith a minor amount equal to at least about 0.25 percent by weight based upon the weight of the resinous powder of a liquid heat-curable silicone polymer which is substantially incompatible with the resinous powder and which is capable of remaining substantially uncured under the temperature and time conditions used to substantially completely cure the resinous powder such that the silicone polymer will seal the cured resinous composition.

2. A novel heat-curable resinous powder composition for the forming of bodies having high moisture resistance comprising a heat-curable epoxy powder having uniformly mixed therewith from about 0.25 percent to about 5 percent by weight based upon the weight of the epoxy powder of a liquid heat-curable silicone polymer which is substantially incompatible with the epoxy powder and which is capable of remaining substantially uncured under the temperature and time conditions used to substantially completely cure the epoxy powder such that the silicone polymer will seal the cured resinous composition.

3. A novel heat-curable resinous molding powder composition for the molding of bodies having high moisture resistance comprising an epoxy molding powder which is substantially completely curable when heated to temperatures between 300° F. and 400° F. for from 1 to 5 minutes having uniformly mixed therewith a minor amount equal to at least about 0.25 percent by weight based upon the weight of the epoxy molding powder of a liquid silicone polymer which is substantially completely curable when heated to temperatures between 200° F. and 400° F. for at least an hour and which is substantially incompatible with the epoxy molding powder, the silicone polymer being capable of remaining substantially uncured under the temperature and time conditions used to substantially completely cure the epoxy molding powder such that the silicone polymer will seal the cured resinous composition.

4. A novel heat-curable resinous molding powder composition for the molding of bodies having high moisture resistance comprising an epoxy molding powder which is substantially completely curable when heated to temperatures between 300° F. and 400° F. for from 1 to 5 minutes having uniformly mixed therewith from about 0.05 percent to about 5 percent by weight based upon the weight of the epoxy molding powder of a liquid silicone polymer which is substantially completely curable when heated to temperatures between 200° F. and 400° F. for at least an hour and which is substantialy incompatible with the epoxy molding powder, the silicone polymer being capable of remaining substantially uncured under the temperature and time conditions used to substantially completely cure the epoxy molding powder such that the silicone polymer will seal the cured resinous composition.

5. A novel heat-curable resinous molding powder composition for the molding of bodies having high moisture resistance comprising an epoxy molding powder which is substantially completely curable when heated to temperatures between 300° F. and 400° F. for from 1 to 5 minutes having uniformly mixed therewith from about 0.75 percent to about 2 percent by weight based upon the weight of the epoxy molding powder of a liquid silicone polymer which is substantially completely curable when heated to temperatures between 200° F. and 400° F. for at least an hour and which is substantially incompatible with the epoxy molding powder, the silicone polymer being capable of remaining substantially uncured under the temperature and time conditions used to substantially completely cure the epoxy molding powder such that the silicone polymer will seal the cured resinous composition.

6. The method of molding bodies having high moisture resistance which comprises the steps of filling a mold with a resinous molding composition comprising a heat-curable epoxy resin having uniformly mixed therewith a minor amount equal to at least about 0.25 percent by weight based upon the weight of the epoxy resin of a liquid heat-curable silicone polymer which is substantially incompatible with the epoxy resin and which is capabl of remaining substantially uncured under the tempera ture and time conditions used to substantially completel cure the epoxy resin; applying heat and pressure to th mold for a relatively short period of time to substantiall completely cure the epoxy resin while the liquid silicon polymer remains substantially uncured; and removing th molded body from the mold to an oven and heating t a temperature and for a period of time sufficient to substantially completely cure the silicone polymer.

7. The method of molding bodies having high moisture resistance which comprises the steps of filling a mold with a resinous molding composition comprising a heat-curable epoxy resin having uniformly mixed therewith from about 0.25 percent to about 5 percent by weight based upon the weight of the epoxy resin of a liquid heat-curable silicone polymer which is substantially incompatible with the epoxy resin and which is capable of remaining substantially uncured under the temperature and time conditions used to substantially completely cure the epoxy resin; heating the mold to a temperature between 300° F. and 400° F. for from 1 to 5 minutes under a pressure of from 50 to 500 p.s.i. to substantially completely cure the epoxy resin while the liquid silicone polymer remains substantially uncured; and removing the molded body from the mold to an oven and heating to a temperature of from 200° F. to 400° F. for at least one hour to substantially completely cure the silicone polymer.

8. The method of encapsulating an electrical component within a molded resinous casing having high moisture resistance which comprises the steps of supporting an electrical component within a mold cavity, filling the mold cavity so as to surround the electrical component with a resinous molding composition comprising a heat-curable epoxy resin having uniformly mixed therewith from about 0.75 percent to about 2 percent by weight based upon the weight of the epoxy resin of a liquid heat-curable silicone polymer which is substantially incompatible with the epoxy resin and which is capable of remaining substantially uncured under the temperature and time conditions used to substantially completely cure the molding resin; heating the mold to a temperature of about 325° F. for from 1 to 5 minutes under a pressure of from 50 to 500 p.s.i. to substantially completely cure the epoxy resin while the liquid silicone polymer remains substantially uncured; and removing the encapsulated electrical component from the mold to an oven and heating to a temperature of about 300° F. for at least about four hours to substantially completely cure the silicone polymer and form a highly moisture resistant casing around the electrical component.

References Cited

UNITED STATES PATENTS

| | | | |
|---|---|---|---|
| 3,107,234 | 10/1963 | Stewart | 264—328 X |
| 3,166,656 | 1/1965 | Hollmann et al. | 264—272 X |
| 3,170,890 | 2/1965 | Boyd et al. | 264—37 |
| 3,205,467 | 9/1965 | Ganci | 264—272 X |
| 3,233,028 | 2/1966 | Toppari et al. | 117—97 X |
| 3,243,752 | 3/1966 | Lawrence | 264—328 X |

ROBERT F. WHITE, *Primary Examiner.*

L. S. SQUIRES, J. A. FINLAYSON, *Assistant Examiners.*